United States Patent
Stefkovich et al.

[11] Patent Number: 5,368,729
[45] Date of Patent: Nov. 29, 1994

[54] SOLID PHASE EXTRACTION DEVICE

[75] Inventors: Joseph Stefkovich, Franklin; Alfonso Liu, Boonton, both of N.J.

[73] Assignee: Whatman, Inc., Clifton, N.J.

[21] Appl. No.: 97,396

[22] Filed: Jul. 23, 1993

[51] Int. Cl.$^5$ .............................................. B01D 24/00
[52] U.S. Cl. ................... 210/266; 210/282; 210/289; 210/490; 210/295; 210/321.75; 210/321.84; 210/453
[58] Field of Search ............... 210/502.1, 266, 282, 210/289, 295, 321.75, 321.84, 490, 453; 422/101; 436/178; 604/406

[56] References Cited

U.S. PATENT DOCUMENTS

| | | | |
|---|---|---|---|
| 4,131,544 | 12/1978 | Elahi . | |
| 4,138,474 | 2/1979 | Updike . | |
| 4,477,347 | 10/1984 | Sylva | 210/321.84 |
| 4,717,476 | 1/1988 | Scott | 210/266 |
| 4,764,274 | 8/1988 | Miller | 210/266 |
| 4,816,161 | 3/1989 | Olmess et al. | 210/266 |
| 4,820,276 | 4/1989 | Moreno . | |
| 4,891,134 | 2/1990 | Vcelka | 210/359 |
| 4,923,680 | 5/1990 | Nelson | 210/506 |
| 4,935,503 | 6/1990 | Mass . | |
| 4,990,253 | 2/1991 | Vcelka | 210/518 |
| 4,995,976 | 2/1991 | Vermes et al. | 210/266 |
| 5,084,168 | 1/1992 | Woog | 210/266 |
| 5,116,502 | 5/1992 | Ferguson | 210/266 |
| 5,139,031 | 8/1992 | Guirguis | 604/406 |

OTHER PUBLICATIONS

Thomas D. Brocktheodore H. Meltzer, "Membrane Filtration Science Tech., Inc." 1983, pp. 48-76.

Millipore Corporation, 1991-1992 Millipore Direct, Millipore Corporation, pp. 10-11.
Theodore H. Meltzer, "Filtration in the Pharmaceutical Industry", Marcel Deker, Inc. 1987, pp. 240-279.

Primary Examiner—Frank Spear
Assistant Examiner—Ana M. Fortuna
Attorney, Agent, or Firm—Mathews, Woodbridge & Collins

[57] ABSTRACT

A solid phase extraction device has a solvent-compatible permeable membrane with a bubble point greater than the normal operating pressure differential used and a sorbent material retained by two disks or frits so that when pressure is applied, the sample to be processed will pass through the membrane, but the membrane will not permit air to pass therethrough, and the sorbent remains wet throughout the process. The device has an input port and an output port and operates to maintain a pressure differential between the ports. Sorbent material is entrapped between two disks or frits. Located above the sorbent material is a support having a grid surface. The support prevents the frit from "riding up" the column of the barrel. Ultrasonically welded to the support is a solvent-compatible permeable membrane. The membrane is hermetically sealed to the support and the support is self-locked to the interior barrel of the device. When wetted, the membrane allows for the passage of matter, but prevents air from passing therethrough to the sorbent material. The sorbent material remains wet. With the sorbent material retained by the frits, the sorbent material will not escape to contaminate the filtrate.

4 Claims, 2 Drawing Sheets

SOLID PHASE EXTRACTION DEVICE

This invention relates to a solid phase extraction device. In particular, it pertains to a device for improving the sample processing, having a membrane with a bubble point greater than the normal operating pressure differential used, and having a sorbent material entrapped within two disks or frits so that when pressure is applied, air does not pass through the membrane, and the sorbent material remains wet until it is desired to remove the liquid from the sorbent, at which time a differential pressure greater than the bubble point of the membrane is used.

BACKGROUND OF THE INVENTION

U.S. Pat. No. 4,138,474 relates to a device for immunological determinations including a housing carrying sorbent material in the form of gel particles and a porous barrier enclosing the gel particles. The barrier is located upstream from the sorbent and is in the form of a nylon fabric or net having openings which do not permit passage of the gel particles. Liquid is drawn into the syringe in an amount to fill the volume below the barrier and preferably in an amount to at least cover the net.

U.S. Pat. No. 5,139,031 relates to a staged filtration device for cytology and microbiological testing. Membrane filters having different porosity are placed in stackable containers. The membrane filters are made of cellulose or polycarbonate. Cell suspension is collected on the membrane. No sorbent is involved in the filtration device.

U.S. Pat. Nos. 4,891,134 and 4,990,253 relate to a sample filtration device employing differential pressure. Filter media are disposed near one end and retained within the core of the hollow plunger by friction means. The filter media include paper, glass fiber, cellulose, and nitrocellulose, the preferred media being fiberglass combined with polypropylene. Depth filters are generally preferred over membrane filters. No sorbent is involved in the filtration device.

U.S. Pat. No. 4,923,680 relates to a device containing a time-delay filter, particularly useful in immunoassay. The filter is positioned between an upper and a lower compartment. The filter comprising the membrane has pores which retain agglutinated or complexed materials on the filter but which allow fluids and unagglutinized materials to pass through. The filter is constructed from glass, ceramics, fibers, or synthetic and natural polymers, the preferred material being cellulose esters, polyamides, and polyesters. The filter is overcoated with at least one water-soluble protein or carbohydrate.

U.S. Pat. No. 4,131,544 relates to a sorbent material encapsulated in a porous filter membrane composed of polypropylene or Teflon ®, also known as polytetrafluoroethlyene. The pore size of the encapsulating membrane is smaller than the particle size of the sorbent material.

U.S. Pat. No. 3,493,503 relates to a disposable and removable filter disposed downstream from the contents of a syringe to produce a protein-free fluid.

U.S. Pat. No. 4,820,276 relates to a filter assembly having compartments containing filter material.

In these devices, the sorbent material separates from the containment devices and contaminates the filtrate. The sorbent also dries out during certain processes in which it should be kept wet to obtain ultimate performance of the device.

SUMMARY OF THE INVENTION

Briefly described, the invention comprises a solid phase extraction device with a solvent-compatible permeable membrane having a bubble point greater than the normal operating pressure differential applied, and which includes sorbent material retained by two disks or frits so that when pressure is applied, air will not pass through the membrane and dry out the sorbent, but other matter will pass therethrough and collect in the sorbent material or collection vial. When desired, a differential pressure greater than the bubble point of the membrane can be employed to remove any liquid from the sorbent bed.

The device has an input port and an output port. The device operates to accept and maintain a pressure differential created either by positive pressure or vacuum between the input port and the output port. The device is normally used with a vacuum chamber or positive pressure source and held in an upright position above a test tube rack by a luer lock or standard fitting near the output port. A collection tube is positioned below the output port of the device. Supported by the test tube rack is a collection vial for collecting filtrate.

A solvent-compatible permeable membrane is located within the interior barrel of the device. The membrane is hermetically sealed to the interior of the barrel and wetted to provide a barrier to air flow below the membrane. Once wet, the pores in the membrane allow liquid or other matter smaller than the pores to pass therethrough, but does not permit the passage of air. Thus, the bubble point of the membrane is greater than the normal operating pressure differential used to filter the sample.

The wetted membrane prevents the sorbent from drying out and forming a non-uniform sorbent matrix, which commonly occurs during vacuum aspiration or positive pressure processing via a gas. The membrane support also maintains the sorbent as an integral unit during transportation and storage. The permeable membrane is composed of polyethylene, polypropylene or Teflon ®, also known as polytetrafluoroethlyene, nylon, or any polymeric or inorganic membrane material.

Ultrasonically welded to the membrane is a support with a grid formed on the top surface of the support. The support has a self-locking function and does not require welding to form a liquid tight seal with the interior of the hollow barrel. The membrane is ultrasonically welded to the support and placed in the hollow barrel to form a tight mechanical fit. The self-locking function of the support seals the membrane to the interior of the barrel. The support keeps the sorbent bed packed tightly and provides support for the membrane. By supporting the membrane, the "riding up" of the disk or frit in the column is prevented by the support.

The support is composed of polypropylene or solid material with a grid formed on the top surface. Undesirable material forming the support would be polymeric resins which have a coefficient of friction less than polypropylene or the composition of the barrel, and which would, over time, allow the support to slide up the column.

Both upstream and downstream frits are composed of polyethylene, polypropylene or any suitable polymeric material. The frits extend perpendicularly across the interior wall of the barrel. Sorbent material is entrapped between the frits. The sorbent material is composed of silica, florisil, or any suitable silica-based or polymer-based sorbent.

When the membrane, support, and frits are in place, the sorbent material in the device is prevented from becoming non-uniformly wet. Because the membrane does not allow air to pass through at normal differential pressures, the sorbent remains wet.

The invention may be more fully understood by reference to the following drawings.

DETAILED DESCRIPTION OF THE PREFERRED EMBODIMENT

During the course of this description like numbers will be used to identify like elements according to the different views which illustrate the invention.

Figure 1:
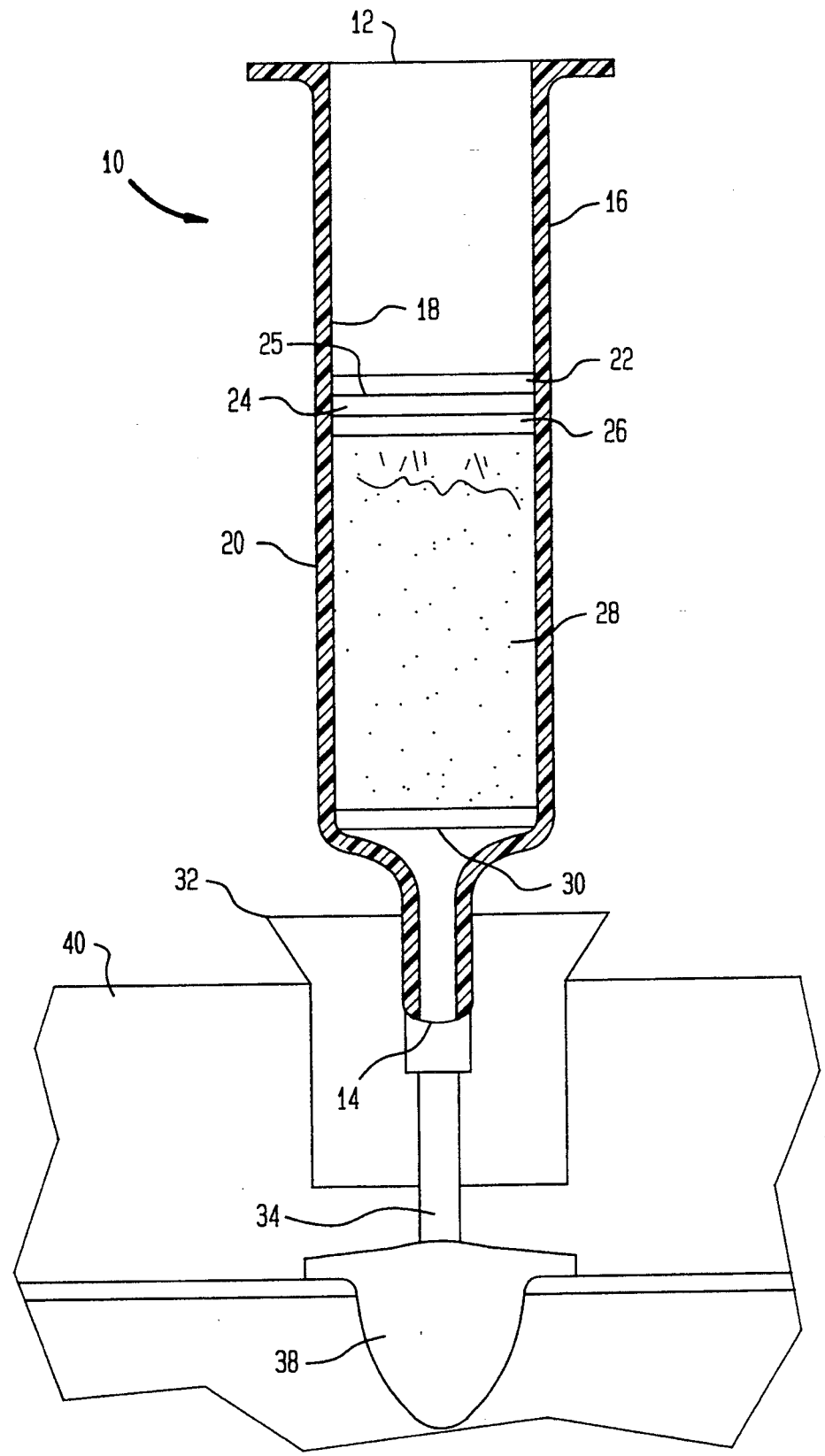
FIG. 1 is a cross-sectional view of the invention.

A solid phase extraction filtering device 10 is shown in cross section inserted in vacuum chamber 40 as shown in phantom in FIG. 1. The device 10 has an input port 12 and an output port 14. The barrel 16 of the device 10 has an interior wall 18 and an exterior wall 20.

Solvent-compatible permeable membrane 22 is shown perpendicular to and in communication with the interior wall 18 of the barrel 16. Membrane 22 has a bubble point greater than the normal operating pressure differential used. A brief discussion of the bubble point test follows.

The membrane 22 of the present invention operates under the bubble point theory. The bubble point test is a simple, non-destructive determination of filter performance. Membrane filters have discrete, uniform passages penetrating from one side to the other which can be thought of as fine, uniform capillaries. Liquid is held in these capillary-like structures by surface tension and the minimum pressure required to force the liquid out of the capillary space is a measure of the capillary diameter. The test is performed by prewetting the filter, increasing the pressure of air upstream of the filter, and watching for air bubbles downstream which indicates the passage of air through the capillaries. The pressure at which a steady continuous stream of bubbles appears is the bubble point pressure.

At pressures below the bubble point, gas passes across the filter by diffusion only. When the pressure is high enough to dislodge liquid from the capillaries, bulk flow begins. At the pressure where bulk flow of gas begins, bubbles will be seen. This transition pressure, called the bubble-point pressure is related to pore size. The contact angle between the water and the membrane changes depending upon the filter material chosen.

Ultrasonically welded to the membrane 22 is support 24. The membrane support 24 is formed of a solid material with a grid 25 formed on the top surface of the support 24.

Entrapped between upstream frit 26 and downstream frit 30 is a sorbent material 28. Similar to the membrane 22 and support 24, both upstream frit 26 and downstream frit 30 extend perpendicular to and are in communication with the interior wall 18 of the barrel 16.

A luer lock 32 holds the device 10 in a vacuum chamber 40. Located at the output port 14 of the device 10 is a collection tube 34. A collection vial 38 is connected to the collection tube 34. The chamber 40 is connected to vacuum source (not shown) for the vacuum processing of a sample.

Figure 2:
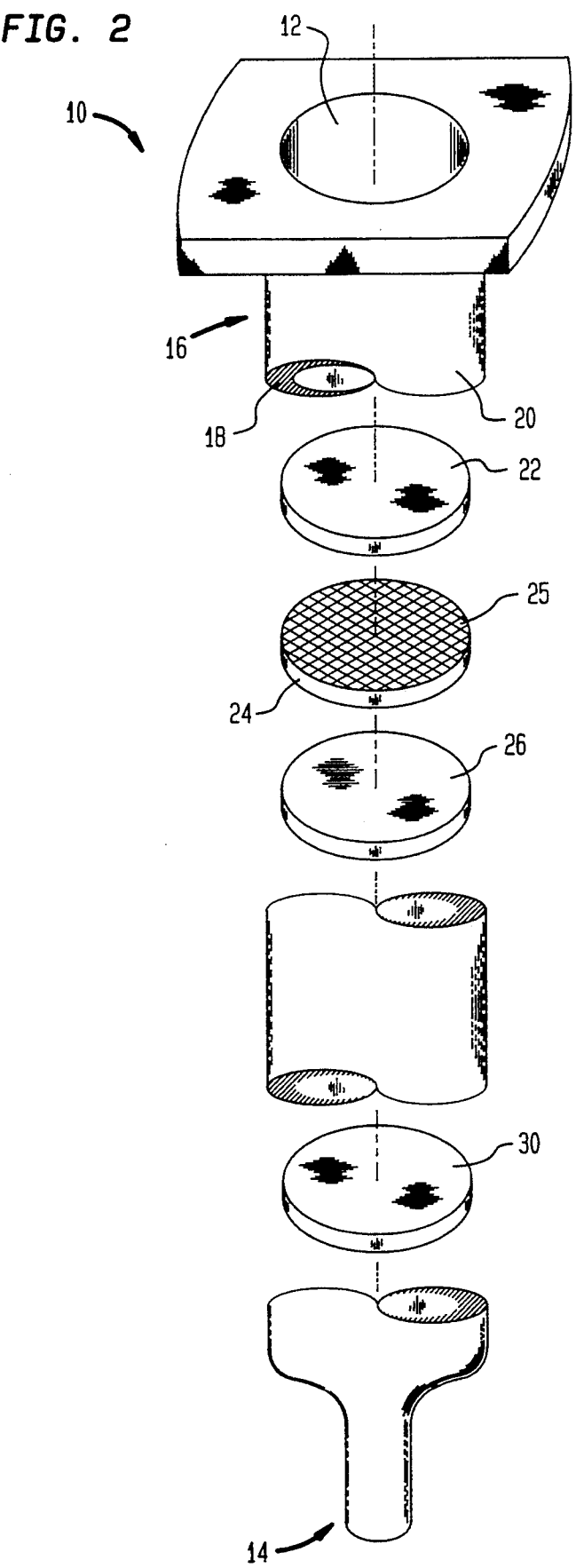
FIG. 2 is an exploded perspective view of the invention.

An exploded perspective view of the invention 10 is illustrated in FIG. 2. Grid 25 is shown on the top surface of the support 24. Support 24 is a molded polypropylene material incorporating a grid 25 to provide stability to the membrane 22. The support 24 is positioned above the upstream frit 26 and below the permeable membrane 22. The support 24 keeps the sorbent material 28 packed tightly and also provides support for the membrane 22. An air-tight relationship between the support 24 and the interior barrel 18 is necessary for the device 10 to operate effectively. An air-tight relationship is possible without the use of welding equipment because the support 24 has a self-locking function with the interior 18 of the barrel 16. Thus, the mechanical interference of the support 24 keeps it locked in position and forms a tight fit. The membrane 22, however, is ultrasonically bonded to the support 24 on the top surface of the support 24, and is locked to the interior 18 of the barrel 16.

Because the device 10 may be reused, the material used in forming the support 24 should be compatible with the material used in the barrel 16. Undesirable materials used in forming the support 24 would allow the support to slide up the column over time.

Selection of the proper material for the membrane 22 will depend on the types of assays and applications used. Preferably, the material chosen will be relatively inert to the assay or application used.

In use, a liquid sample to be processed is placed in the input port 12 of the device 10. Differential pressure is applied and maintained between the input port 12 and output port 14 of the device 10. During processing, the sample passes through the output port 14, drains through the collection tube 34, and collects in collection vial 38. The collection vial 38 can be removed to obtain the filtrate. Alternatively, the sorbent material 28 may be subjected to further processes, assays, or other analytical techniques.

In summary, the solid phase extraction device prevents air from passing through the membrane when normal operating differential pressure is applied. When air passes through the prior art devices, the sorbent material dries out inconsistently during the process. The present invention prevents the passage of air through the membrane and, thus, the maximum amount of the sorbent remains uniformly wet during the process. The device enhances the effectiveness of the sorbent material. The frits retain the sorbent material to prevent contamination of the filtrate.

While the invention has been described with reference to the preferred embodiment thereof, it will be appreciated by those of ordinary skill in the art that modifications can be made to the structure and elements of the invention without departing from the spirit and scope of the invention as a whole.

What is claimed is:

1. In a hollow solid phase extraction device having an input port and an output port, sorbent-retaining means disposed between said input port and said output port, and a sorbent material entrapped within said sorbent retaining means, said device being operable to accept and maintain a pressure differential between said input port and said output port, the improvement comprising:
    (i) a solvent-compatible permeable membrane having a bubble point greater than the normal operating pressure differential normally applied between said input port and said output port which allows solvent to pass through said membrane while precluding the passage of air therethrough, thereby preventing said sorbent material from drying out, and, (ii) membrane support means supporting said membrane, said membrane support means being disposed upstream from said sorbent retaining means in an air-tight relationship with said interior of said extraction device.

2. The device of claim 1 wherein said solvent-compatible permeable membrane includes pores within a range of 0.2 and 0.002 micrometers.

3. The device of claim 2 wherein said solvent-compatible permeable membrane is composed of a polymeric or inorganic material.

4. The device of claim 3 wherein said membrane support means comprises molded polypropylene grid.

* * * * *